Jan. 7, 1969 H. HAAS 3,420,964
ROTATING HEAD WHEEL WITH MOTOR ON COMMON SHAFT
Filed Nov. 1, 1961
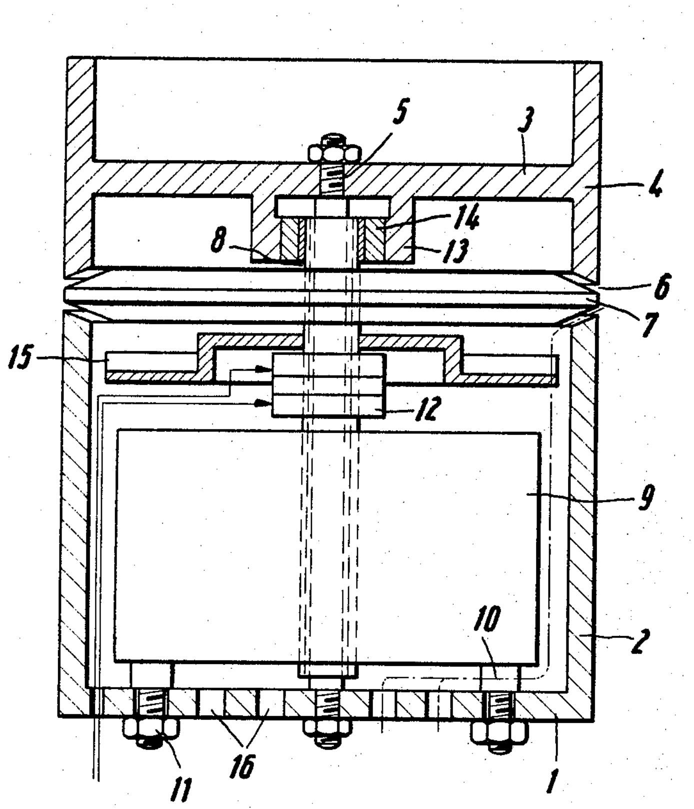
Inventor:
Helmut Haas
By Michael S. Striker
Attorney 3,420,964

ROTATING HEAD WHEEL WITH MOTOR ON COMMON SHAFT

Helmut Haas, Kronach, Upper Franconia, Germany, assignor to Loewe Opta A.G., Berlin, Germany, a company of Germany Filed Nov. 1, 1961, Ser. No. 149,469

Claims priority, application Germany, Nov. 5, 1960, L 37,444

U.S. Cl. 179—100.2 5 Claims

Int. Cl. G11b *5/00;* G11b *5/52;* H04n *5/76*

The invention relates to a device for the magnetic recording and reproducing and more particularly to a means for recording high-frequency signals as television signals on a tape. One problem to record television signals is to obtain a high relative velocity between a magnetic head and the tape. A known magnetic tape system solves this problem by providing a pair of cylinders positioned coaxially and end-to-end with a slight gap between them in which a magnetic head carrier of the same diameter as the cylinders is rotating. In such devices the head carrier is driven at a relative high speed and the tape is wrapped helically once around the cylinders with its edges abutting across the gap at a speed of about 50 centimeters per second.

For holding the pair of cylinders in a certain end-to-end position additional means must be provided which—in the known apparatus—will hinder to insert the tape.

It is an object of the present invention to provide an improved means which will not be subject to the aforementioned disadvantage.

The device must be characterised by smallest possible installation dimensions with relatively sturdy construction. Further application of the tape to the cylinders should not be impeded by parts serving to connect the two cylinders. Finally provision must be made for effectively carrying off heat due to energy losses from the driving motor. These and other objects of the invention are attained by providing an apparatus for recording and reproducing magnetic tape comprising a pair of cup-shaped drum members in spaced apart aligned relation having the bottom walls thereof remote from one another, a disc having a magnetic head connected with the periphery of said disc within the space between said drums, and means for securing said drums and discs on a frame; said means comprising a frame member, connecting means securing the bottom wall of one of said drums on said frame member, a coaxial rod member having one end connected with said frame member and the other end secured to the bottom wall of the drum remote from said frame member, bearing means mounting said disc on said rod member, and prime mover means within at least one of said drums for driving said disc.

Further details of the invention may be better understood in connection with the accompanying drawing, which represents an exemplary design in longitudinal section:

Closed below by a base 1, a lower cup-shaped drum member 2 secured on a frame and an upper member 4 provided with a plate 3 are held together by an axial distance bolt 5 so that between the two members an annular gap 6 is left open. In the annular gap 6 a circular, rotatable carrier disc 7 engages, having on its periphery several magnetic recording and reproducing heads not shown in the drawing. The periphery of the carrier disc registers with that of the members 2 and 4, so that the recording gaps of the magnetic heads lie on the plane of the jacket surfaces of the members. The carrier disc is fixed to an axial hollow shaft 8 of an electric motor 9, which is attached over the bolt 5 and anchored inside the lower member 2 with fastening bolts 10 and nuts 11.

On hollow shaft 8 there is further mounted a collector 12 for the electric connection of the magnetic heads. Formed in one piece with the partition 3 of the upper member 4 a concentric collar accommodates a bearing 14 in which the hollow shaft 8 is inserted.

For cooling, the electric motor serves a fan wheel 15 fixed to the hollow shaft 8 disc itself. Suction of coolant air is performed e.g. through perforations 16 in the base 1 and ejection of heated air through annular gap 6.

What I claim is:

1. Apparatus for recording/reproducing magnetic tape comprising a pair of cup-shaped drum members in spaced apart aligned relation having the bottom walls thereof remote from one another, a disc having a magnetic head connected with the periphery of said disc within the space between said drums, and means for securing said drums and discs on a frame; said means comprising a frame member, connecting means securing the bottom wall of one of said drums on said frame member, a coaxial rod member having one end connected with said frame member and the other end secured to the bottom wall of the drum remote from said frame member, bearing means mounting said disc on said rod member, and prime mover means within at least one of said drums for driving said disc.

2. Apparatus for recording/reproducing magnetic tape comprising a pair of cup-shaped drum members in spaced apart aligned relation having the bottom walls thereof remote from one another, a disc having a magnetic head connected with the periphery of said disc within the space between said drums, and means for securing said drums and discs on a frame; said means comprising a frame member, connecting means securing the bottom wall of one of said drums on said frame member, a coaxial rod member having one end connected with said frame member and the other end secured to the bottom wall of the drum remote from said frame member, bearing means mounting said disc on said rod member, and prime mover means within at least one of said drums for driving said disc; said drum members being provided with several perforations for the entry and exit of air and said bearing means carrying a fan wheel.

3. Apparatus for recording/reproducing magnetic tape comprising a pair of non-rotatable drum members arranged in spaced apart aligned relation, a disc having a magnetic head connected with the periphery of said disc within the space between said drum members, elongated connecting means arranged coaxially with said drum members for connecting the same to each other so that application of magnetic tape to the peripheral surfaces of said drum members is not impeded by said elongated connecting means, means for rotatably mounting said disc on said elongated connecting means, and prime mover means for driving said disc.

4. Apparatus as defined in claim 3, wherein said drum members are cup-shaped and having respectively bottom walls remote from one another, and wherein said elongated connecting means includes a rod member coaxial with said drum members and connected at opposite ends thereof to said bottom walls of said drum members.

5. Apparatus as defined in claim 3, wherein said connecting means include an elongated rod coaxial with said drum members and said means for rotatably mounting said disc include a hollow shaft turnably mounted on said rod, and wherein said prime mover means are connected to said hollow shaft.

(References on following page)

References Cited

UNITED STATES PATENTS

| | | | |
|---|---|---|---|
| 2,773,120 | 12/1956 | Masterson | 340—174.1 |
| 3,042,756 | 7/1962 | Buslik | 179—100.2 |

BERNARD KONICK, *Primary Examiner.*

J. R. GOUDEAU, *Assistant Examiner.*

U.S. Cl. X.R.

178—6.6